(12) United States Patent
Bhattacharya

(10) Patent No.: US 9,619,372 B2
(45) Date of Patent: Apr. 11, 2017

(54) METHOD AND SYSTEM FOR HYBRID TESTING

(71) Applicant: Sourav Sam Bhattacharya, Fountain Hills, AZ (US)

(72) Inventor: Sourav Sam Bhattacharya, Fountain Hills, AZ (US)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 14/618,435

(22) Filed: Feb. 10, 2015

(65) Prior Publication Data

US 2016/0232080 A1    Aug. 11, 2016

(51) Int. Cl.
G06F 11/36      (2006.01)
G06F 21/57      (2013.01)
H04L 29/06      (2006.01)

(52) U.S. Cl.
CPC .......... *G06F 11/3672* (2013.01); *G06F 21/57* (2013.01); *G06F 21/577* (2013.01); *H04L 63/1433* (2013.01); *G06F 2221/033* (2013.01); *H04L 63/02* (2013.01)

(58) Field of Classification Search
None
See application file for complete search history.

(56) References Cited

U.S. PATENT DOCUMENTS

| 7,478,428 | B1 * | 1/2009 | Thomlinson | ............ G06F 21/57 710/56 |
| 8,494,832 | B2 | 7/2013 | Krishnan et al. | |
| 8,539,438 | B2 | 9/2013 | Bassin et al. | |
| 9,015,844 | B1 * | 4/2015 | Franklin | ............... G06F 21/577 713/165 |
| 2004/0073886 | A1 | 4/2004 | Irani | |
| 2007/0162894 | A1 * | 7/2007 | Noller | ................. G06F 11/3688 717/124 |
| 2008/0313739 | A1 * | 12/2008 | Martin | ................. G06F 21/577 726/25 |

(Continued)

OTHER PUBLICATIONS

McGraw, "Software Security Testing," 2004, IEEE Security & Privacy, vol. 2, Issue 5, pp. 81-85.*

(Continued)

*Primary Examiner* — Thuy Dao
*Assistant Examiner* — Stephen Berman
(74) *Attorney, Agent, or Firm* — Finnegan, Henderson, Farabow, Garrett & Dunner, LLP

(57) ABSTRACT

Embodiments of the present disclosure relate to methods and systems for hybrid testing, combining the optimization features of functional testing brought forth to security testing. One disclosed method may include receiving a list of input points associated with a software unit under test and assigning, by a processor, risk values to the input points based on one or more risk rating factors. The risk values may reflect security risk associated with the input points. The method may further include providing, to the software unit under test, input values indicative of a functional test for input points assigned values reflecting a low security risk and input values indicative of a security test for input points assigned values reflecting a high security risk. The method may further include executing a security test for the software unit under test using the input values.

18 Claims, 7 Drawing Sheets

(56) References Cited

U.S. PATENT DOCUMENTS

| | | | |
|---|---|---|---|
| 2011/0067005 A1* | 3/2011 | Bassin | G06F 11/008 717/127 |
| 2011/0173693 A1* | 7/2011 | Wysopal | G06F 11/3612 726/19 |
| 2012/0284697 A1* | 11/2012 | Choppakatla | G06F 11/3612 717/127 |
| 2013/0232474 A1* | 9/2013 | Leclair | G06F 9/44 717/134 |
| 2014/0380277 A1* | 12/2014 | Bhagavatula | G06F 11/3684 717/124 |
| 2015/0020045 A1* | 1/2015 | Deng | G06F 11/36 717/106 |
| 2015/0040229 A1* | 2/2015 | Chan | G06F 21/577 726/25 |
| 2015/0095888 A1* | 4/2015 | Tripp | G06F 11/3672 717/124 |
| 2015/0264074 A1* | 9/2015 | Mendelev | G06F 11/3672 726/25 |
| 2015/0309918 A1* | 10/2015 | Raghavan | G06F 11/3684 714/38.1 |

OTHER PUBLICATIONS

Mahmood et al., "A whitebox approach for automated security testing of Android applications on the cloud," 2012, 7th International Workshop on Automation of Software Test (AST), pp. 22-28.*

Huang et al., "Web application security assessment by fault injection and behavior monitoring," 2003, Proceedings of the 12th international conference on World Wide Web, pp. 148-159.*

Haixia et al., "A database security testing scheme of web application," 2009, 4th International Conference on Computer Science & Education, pp. 953-955.*

* cited by examiner

METHOD AND SYSTEM FOR HYBRID TESTING

TECHNICAL FIELD

The present disclosure relates generally to software testing. More particularly, the present disclosure relates to methods and systems for hybrid software testing.

BACKGROUND

Software products undergo a wide range of testing before being released to production. For example, software products may be evaluated using functional testing and security testing. The goal of a functional test may be to verify that the software under test performs as intended (i.e., positive test cases) and not as disallowed (i.e., negative test cases). Functional testing generally provides preset test values to the software unit under test according to the software product's intended business use cases. The goal of a security test, on the other hand, may be to break the software under test instead of ensuring the software under test works as intended per business logic. Security testing generally provides unexpected and nontraditional values to the software unit under test in an attempt to identify weaknesses in the software and areas where the software may be vulnerable to attack.

Functional test cases may be more easily understood by stakeholders and therefore more easily accepted as a development cost. Security testing, however, is may often be miss-understood or less understood by stakeholders and may sometimes be treated as a check-mark criteria. Therefore, some business applications may desire the integration of security testing with functional testing. However, integration of functional and security testing may be difficult because security testing may have very little relevance to a functional test environment since the test objectives and test methods of the two are nearly disjoint.

Accordingly, it may be advantageous to provide simple and efficient methods and systems for hybrid testing of software products. It may also be advantageous to provide methods and systems for hybrid testing that may reduce the total cost and time associated with executing functional and security tests independently.

SUMMARY

In one embodiment, a method for hybrid testing is disclosed. The method may include receiving a list of input points associated with a software unit under test and assigning, by a processor, risk values to the input points based on one or more risk rating factors. The risk values may reflect security risk associated with the input points. The method may further include providing, to the software unit under test, input values indicative of a functional test for input points assigned risk values reflecting a low security risk and input values indicative of a security test for input points assigned risk values reflecting a high security risk. The method may further include executing a security test for the software unit under test using the input values.

In another embodiment, a system for hybrid testing is disclosed. The system may comprise one or more hardware processors, and one or more memory devices storing instructions executable by the one or more hardware processors. The instructions may be executable by the one or more hardware processors for receiving a list of input points associated with a software unit under test and assigning, by a processor, risk values to the input points based on one or more risk rating factors. The risk values may reflect security risk associated with the input points. The instructions may also be executable the one or more hardware processors for providing, to the software unit under test, input values indicative of a functional test for input points assigned risk values reflecting a low security risk and input values indicative of a security test for input points assigned risk values reflecting a high security risk. The instructions may further be executable the one or more hardware processors for executing a security test for the software unit under test using the input values.

In yet another embodiment, a non-transitory computer-readable medium is disclosed, which may store instructions for hybrid testing. The instructions may include receiving a list of input points associated with a software unit under test and assigning, by a processor, risk values to the input points based on one or more risk rating factors. The risk values may reflect security risk associated with the input points. The instructions may also include providing, to the software unit under test, input values indicative of a functional test for input points assigned risk values reflecting a low security risk and input values indicative of a security test for input points assigned values reflecting a high security risk. The instructions may further include executing a security test for the software unit under test using the input values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described regarding the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide improved methods and systems for hybrid software testing. The disclosed embodiments may categorize certain input points of a software unit under test to be tested under the auspices of functional testing, while keeping the rest of the inputs subject to the unpredictable and unconstrained maneuvering scope of security testing. The disclosed embodiments may flexibility assign risk ratings to each input point, and then quarantine input points having a risk rating greater than a specified risk rating threshold. Those input points having a risk rating greater than the threshold may be subjected to a security test (i.e., penetration test) while the remaining input points may be allocated functional test-specific input values.

Accordingly, it may be advantageous to provide methods and systems for hybrid software testing. It may also be advantageous to provide methods and systems for hybrid testing that may reduce the total cost and time associated with executing functional and security tests independently.

Figure 1:
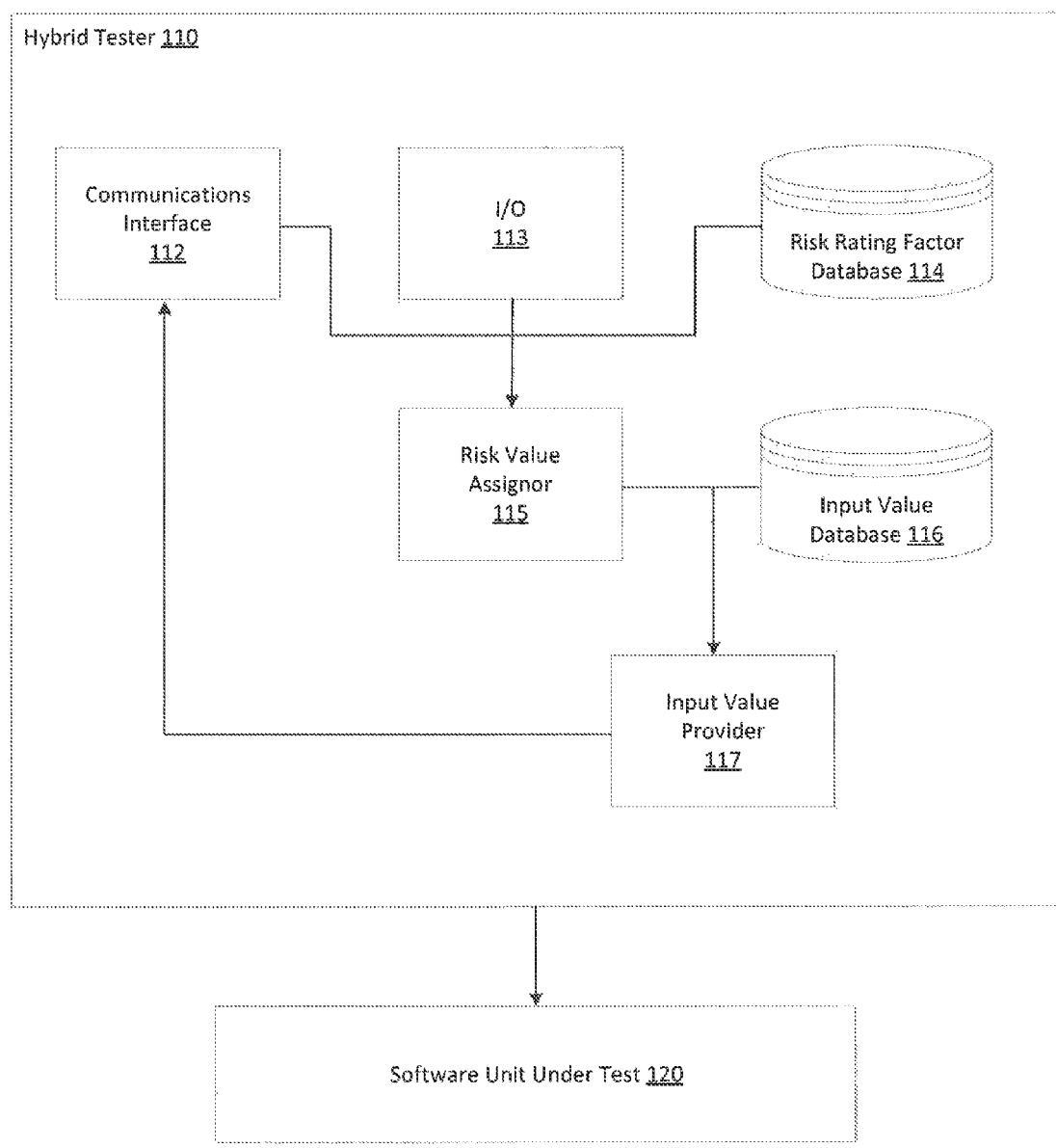
FIG. 1 is a functional block diagram illustrating an example hybrid testing system, according to some embodiments of the present disclosure.

FIG. 1 depicts a functional block diagram illustrating an exemplary hybrid testing system 100. Hybrid testing system 100 may include a hybrid tester 110 and a software unit under test (SUT) 120. It will be appreciated from this disclosure that the number and arrangement of these components is exemplary only and provided for purposes of illustration. Other arrangements and numbers of components may be utilized without departing from the teachings and embodiments of the present disclosure.

As shown in FIG. 1, hybrid tester 110 may include one or more communications interfaces 112. Communications interface 112 may send and/or receive various data and information between hybrid tester 110 and other components. For example, communications interface 112 may send and/or receive various data and information between hybrid tester 110 and other hybrid testers, network clients, servers, SUTs (e.g., SUT 120), databases, etc. Examples of communications interface 112 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, a cellular communications interface (e.g., GSM, EDGE, LTE, LTE Advanced, CDMA (cdmaOne, CDMA2000), etc.) Communications interface 112 may transfer software and data in the form of signals, which may be electronic, electromagnetic, optical, or other signals capable of being received by communications interface 112. These signals may be provided to and from communications interface 112 via a network (not shown), which may be implemented using wireless, wire, cable, fiber optics, radio frequency ("RF") link, and/or other communications channels. Alternative, or in addition, these signals may be provided to and from communications interface 112 via a direct connection such as, for example, Wi-Fi Direct, Bluetooth, or a direct wired connection (e.g., Ethernet, USB, etc.).

In some embodiments, communications interface 112 may provide (i.e., transmit, send, transfer, etc.) test input values to SUT 120. Communications interface 112 may provide the test input values so that hybrid tester 110 may execute a security test for SUT 120 using the input values. Each input value may be associated with a specific input point of SUT 120. However, input values may be associated with multiple input points of SUT 120 or some combination thereof. The security test may comprise a penetration test, a source code security test, any other security tests known in the art, or any combination of security testing thereof. The test input values may be indicative of a functional test or a security test. The input values will be described in further detail below in reference to input value provider 117.

Communications interface 112 may receive outputs from SUT 120 as a result of the executed security test. For example, SUT 120 will generally provide a response to the input values received from hybrid tester 110. Hybrid tester 110 and/or a user (e.g., test architect) may review the responses provided by SUT 120 and determine whether the responses are within an acceptable range. Functional test input values may be selected to generate expected acceptable (i.e., positive test cases) or unacceptable (i.e., negative test cases) responses. On the other hand, successful and unsuccessful security test results are difficult to identify because test response are unpredictable due to the objective of the security test to break the SUT 120. Thus, the test architect may be one capable of differentiating between security test outcomes.

In some embodiments, communications interface 112 may receive a list of N input points. The input points may be associated with SUT 120. Input points may be locations in the SUT 120 that allow for external sources to provide input. For example, an input point may be a text-entry point where a user may enter a user name, password, addresses, personal information, number values, combination of words and other characters, or any form of text entry known in the art. Hybrid tester 110 may store the received list of input points in a database (not shown).

In some embodiments, input/output (I/O) 113 may receive the list of input points. In still some other embodiments, communications interface 112 and I/O 113 may each receive a portion of the list of input points. By way of example, I/O 113 may include physical keyboards, virtual touch-screen keyboards, mice, joysticks, styluses, etc. I/O 113 may receive the list of input points, for example, as input from a user such as a test architect.

Risk value assignor 115 may assign risk values to the input points received by communications interface 112 and/or I/O 113. The risk values may reflect security risk associated with the received input points. Risk values may for example, reflect a low security risk, a high security risk, or any classification of security risk known in the art. Risk value assignor 115 may assign risk values to input points based on one or more risk rating factors and store the assigned risk values in a database (not shown) along with the associated input points. In some embodiments, the risk rating factors may be stored in a risk rating factor database 114. In some other embodiments, the risk rating factors may be stored in a component remote to hybrid tester 110 such as, for example, a server, client, remote database, etc. Hybrid tester 110 may access or retrieve the risk rating factors from the remote component through communications interface 112. In still some further embodiments, the risk rating factors may be received by I/O 113 in the form as input from a user (e.g., a test architect).

Risk rating factor database 114 may comprise a spreadsheet (with or without executable macros), a database such as a database with executable SQL queries, MySQL, IBM DB2®, Microsoft Access®, PERL, C/C++, Java®, or any form of storage that is capable of storing the risk rating factors. The risk rating factors may comprise various criteria used to determine whether an input point is a high security risk or a low security risk. For example, the risk rating factors may comprise a source of input associated with each input point, credibility of a provider of the input, transmission line security of the channel for inputs that are remotely provided, positioning of the input points relative to a firewall, or intrusion detection and intrusion prevention associated with the software unit under test, or any criteria known in the art for used to determine input point security risk. The source of input associated with each input point may be, for example, the Internet, an intranet, a wireless access point, direct connection (wired or wireless), or any other source of input known in the art. Credibility of the input provider may be based on the type of input provider. For example, an input provider may be defined as a class of user such as, for example, an employee, a customer, an unknown third party, an administrator, a general user, or any other class of users known in the art.

In some embodiments, a user (e.g., test architect) may provide input via I/O 113 to modify or override the risk values assigned by risk value assignor 115. For example, the user may retrieve risk values assigned to the input points by risk value assignor 115 that are stored in the database. In some embodiments, the user may review the risk values using a display screen of hybrid tester 110 (not shown). The user may determine (e.g., based on the user's knowledge of software testing and the SUT 120) that a risk value assigned to one or more input points may be incorrect or undesirable. The user may correct the risk value by assigning an updated risk value to the input point and store the input point and its updated risk value back in the database. In some embodiments, the user may be familiar with SUT 120, and have such knowledge as the legal and compliance implications of each type of data generally received for each input point, the expected source of the inputs, the production deployment environment, locations of firewalls, intrusion detection systems (IDS), intrusion prevention systems (IPS), the type and value sensitivity of the expected inputs, etc.

Input value provider 117 may provide input values to SUT 120 for executing the security test. The test input values may be provided to SUT 120 through communications interface 112. In some embodiments, the input values may be provided based on the risk values assigned to the input points. Moreover, the input values may be indicative of a functional test or a security test. For example, input value provider 117 may provide input values indicative of a functional test for input points assigned risk values reflecting a low security risk. As another example, input value provider 117 may provide input values indicative of a security test for input points assigned risk values of a high security risk. Thus, testing time and costs can be reduced compared to independent functional and security tests by using predictable test values (i.e., values that would typically be used in a functional test) for input points that may not need rigorous validation while still performing security testing on input points having a high security risk. Moreover, testing time and costs can be reduced by running a single test (i.e., a security test) on a SUT and using predictable and unpredictable test values when needed.

Input value provider 117 may provide input values to SUT 120 using a cross-bar (X-Bar) Switch. The X-Bar Switch may be an N×N matrix, where N is the total number of input points that are being tested during the security test for a SUT 120. Each cell position (I, I) of the X-Bar Matrix, where I may be a given input point for 0≤I≥N, may contain a value identifying whether a test value indicative of a functional test or a test value indicative of a security test will be provided for the $I^{th}$ input point of SUT 120. The For example, a cell position (I, I) may contain a value of 1, thereby identifying a test value indicative of a functional test will be provided. As another example, a cell position (I, I) may contain a value of −1, thereby identifying a test value indicative of a security test will be provided. However, it will be noted that any values may be used to distinguish between test values indicative of a functional test and test values indicative of a security test. Input value provider 117 may provide an input value to SUT 120 for each $I^{th}$ point according to the value stored in cell position (I, I).

In some embodiments, the input values may be stored in an input value database 116. In some other embodiments, the input values may be stored in a component remote to hybrid tester 110 such as, for example, a server, client, remote database, etc. Hybrid tester 110 may access or retrieve the input values from the remote component through communications interface 112. In still some further embodiments, the input values may be received by I/O 113 in the form as input from a user (e.g., a test architect). Input value database 116 may comprise a spreadsheet (with or without executable macros), a database such as a database with executable SQL queries, MySQL, IBM DB2®, Microsoft Access®, PERL, C/C++, Java®, or any form of storage that is capable of storing the input values.

Figure 2:
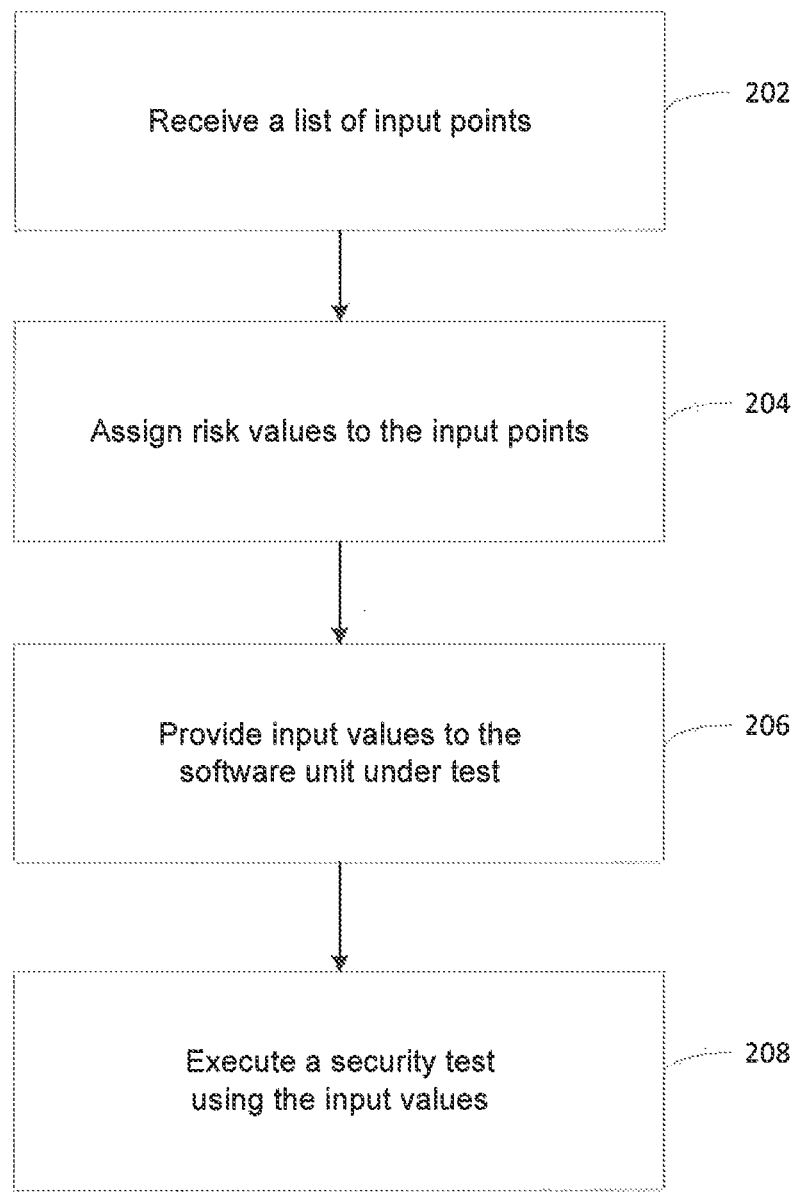
FIG. 2 is a flow diagram illustrating an example method for hybrid testing, in accordance with some embodiments of the present disclosure.

FIG. 2 depicts a flowchart of an example method 200, consistent with some embodiments and aspects of the present disclosure. Method 200 may be implemented, for example, for hybrid testing. In some embodiments, method 200 may be implemented as one or more computer programs executed by one or more processors. Moreover, in some embodiments, method 200 may be implemented by a hybrid test system (e.g., hybrid test system 100 or hybrid tester 110 having one or more processors executing one or more computer programs stored on a non-transitory computer readable medium).

In some embodiments, example method 200 may include receiving a list of input points at 202. For example, communications interface 112 of hybrid tester 110 may receive a list of input points associated with a SUT (e.g., SUT 120). As another example, I/O 113 of hybrid tester 110 may receive the list of input points as input from a user (e.g., test architect). Hybrid tester 110 may store the input points in a database.

In some embodiments, example method 200 may include assigning risk values to the input points at 204. For example, risk value assignor 115 of hybrid tester 110 may assign the risk values to the input points based on one or more risk rating factors. The risk values may reflect security risk associated with the input points.

In some embodiments, example method 200 may include providing input values to the SUT at 206. For example, input value provider 117 may provide input values indicative of a functional test, input values indicative of a security test, or any other input values to SUT 120 known in the art. Input value provider 117 may provide input values indicative of a functional test for input points assigned risk values reflecting a low security risk. Input value provider 117 may provide input values indicative of a security test for input points assigned risk values reflecting a high security risk. Input value provider 117 may provide the input values to SUT 120, for example, via communications interface 112.

In some embodiments, example method 200 may include executing a security test for the SUT at 206. For example, hybrid tester 110 may execute a security test for SUT 120 using the input values. The security test may comprise a penetration test, a source code security test, any other security tests known in the art, or any combination thereof. Communications interface 112 may receive outputs from SUT 120 as a result of the executed security test. For example, SUT 120 will generally provide a response to the input values received from hybrid tester 110. Hybrid tester 110 and/or a user (e.g., test architect) may review the responses provided by SUT 120 and determine whether the responses are within an acceptable range. Functional test input values may be selected to generate expected acceptable (i.e., positive test cases) or unacceptable (i.e., negative test cases) responses. On the other hand, successful and unsuccessful security test results are difficult to identify because test response are unpredictable due to the objective of the security test to break the SUT 120. Thus, the test architect may be one capable of differentiating between security test outcomes.

Figure 3:
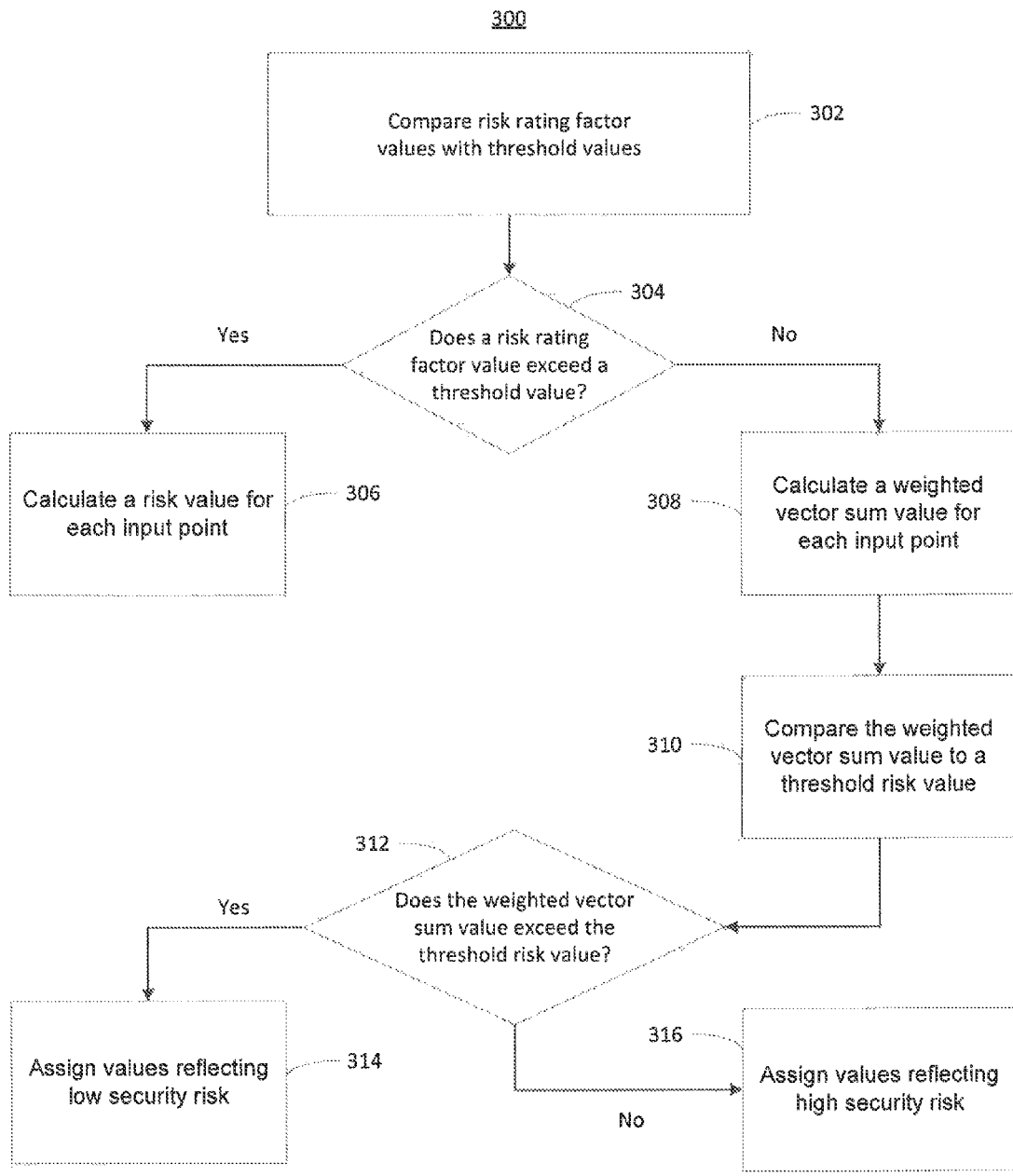
FIG. 3 is a flow diagram illustrating an example method for assigning risk values, according to some embodiments of the present disclosure.

FIG. 3 depicts a flowchart of an example method 300, consistent with some embodiments and aspects of the present disclosure. Method 300 may be implemented, for example, for assigning risk values. In some embodiments, method 300 may be implemented as one or more computer programs executed by one or more processors. Moreover, in some embodiments, method 300 may be implemented by a hybrid test system (e.g., hybrid test system 100 or hybrid tester 110 having one or more processors executing one or more computer programs stored on a non-transitory computer readable medium).

In some embodiments, example method 300 may include comparing risk rating factor values at 302. For example, risk value assignor 115 of hybrid tester 110 may serially compare values of each risk rating factor with respective threshold values. Risk value assignor 115 may determine the values of each risk rating factor based on the amount of risk each risk rating factor contributes to the security risk of a given input point. The threshold values may be predetermined by, for example, the customer, the test architect, the software development business, the software testing business (e.g., if the software testing business is a third-party business), or some combination thereof. The threshold values may be selected based upon, for example, production use cases, the level of security threat each risk rating factor imposes on the input point, or any other factor known in the art. Moreover, the threshold values may be different or the same for each input point.

Risk value assignor 115 may determine whether each risk rating factor value exceeds the respective threshold value at 304. If one of the risk rating factor values exceeds a respective threshold value at 304, then risk value assignor 115 may calculate a risk value for each input point at 306. If no risk rating factor value exceeds a respective threshold value at 304, then risk value assignor 115 may calculate a weighted vector sum value for each input point based on the risk rating factors.

Risk value assignor 115 may compare the weighted vector sum values to a threshold risk value at 310. The threshold risk value may be predetermined by, for example, the customer, the test architect, the software development business, or some combination thereof. The threshold risk value may be set based upon, for example, production use cases, the level of susceptibility to security threats of each of each input point or any other factor known in the art. Moreover, the threshold risk value may be different or the same for each input point.

Risk value assignor 115 may determine whether the weighted vector sum values exceed the threshold risk value at 312. If an input point has a weighted vector sum value that exceeds a threshold risk value at 312, then risk value assignor 115 may assign a risk value reflecting a high security risk to that input point at 314. If an input point has a weighted vector sum value that does not exceed a threshold risk value at 312, then risk value assignor 115 may assign a risk value reflecting a low security risk to the input point. Accordingly, input value provider 118 may provide input values indicative of a functional test or security test for input points based on their assigned security risk.

Computer System

Figure 4:
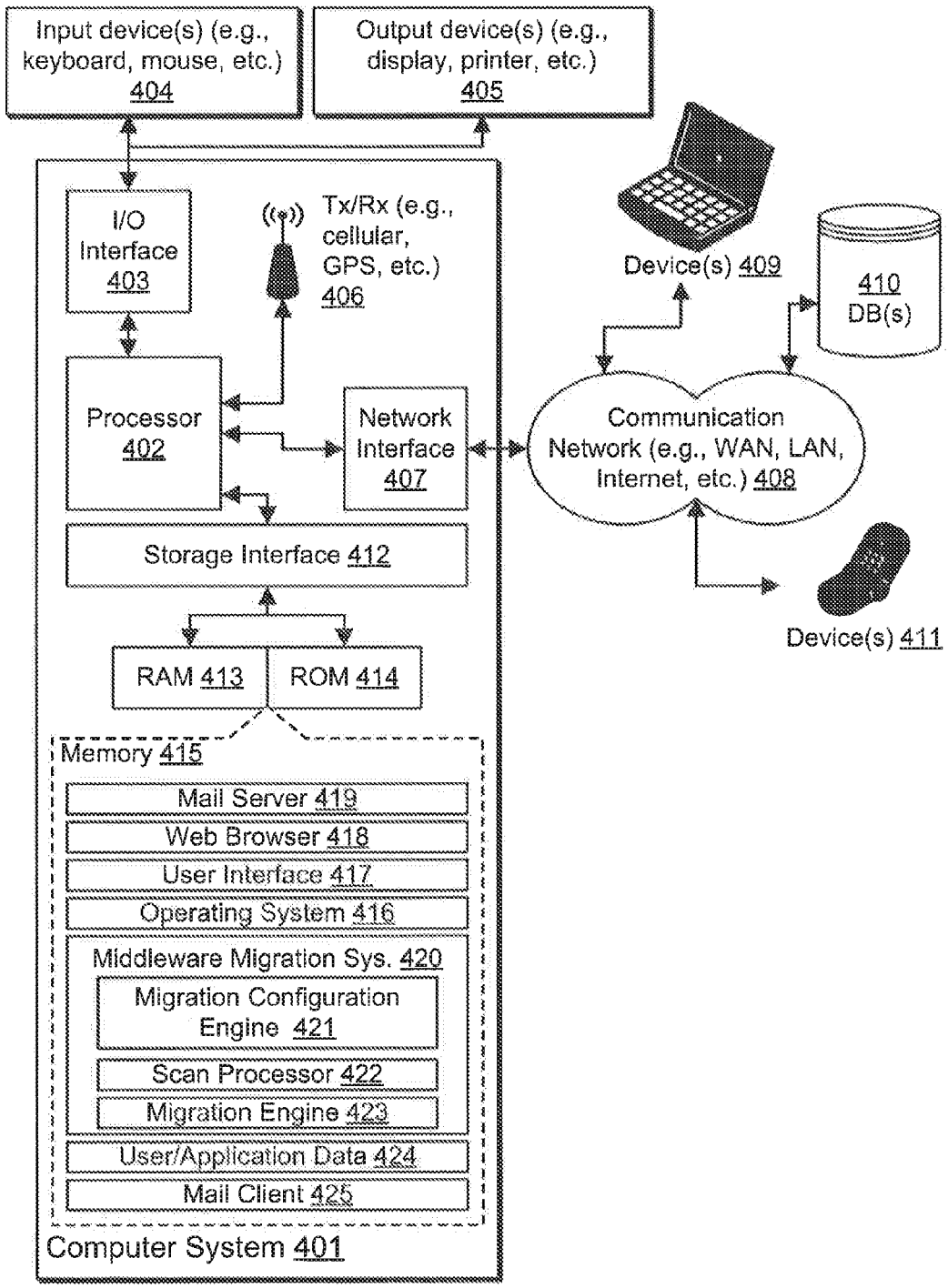
FIG. 4 is a block diagram of an example computer system according to some embodiments of the present disclosure.

FIG. 4 is a block diagram of an exemplary computer system for implementing embodiments consistent with the present disclosure. Variations of computer system 401 may be used for implementing the hybrid testing system 100 and/or the hybrid tester 110. Computer system 401 may comprise a central processing unit ("CPU" or "processor") 402. Processor 402 may comprise at least one data processor for executing program nodes for executing user- or system-generated requests. For example, processor 402 may implement some or all of the functions of risk value assigner 115 and/or input value provider described above A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as, for example, AMD Athlon, Duron or Opteron, ARM's application, embedded or secure processors, IBM PowerPC, Intel's Core, Itanium, Xeon, Celeron or other line of processors, etc. Processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. In some embodiments, I/O interface 403 may be implement some or all of the functions of I/O 113 described above. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc. In some embodiments, transceiver 406 may implement some or all of the functions of communications interface 112 described above.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with data store 410, and/or devices 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, data store 410.

The memory devices 413 and 414 (memory 415, collectively) may store a collection of program or database components, including, without limitation, an operating system 416, user interface 417, web browser 418, mail server 419, mail client 425, user/application data 424 (e.g., any data variables or data records discussed in this disclosure), etc. In some embodiments, memory 415 may implement some or all of the functions of risk rating factor database 114 and input value database 116 described above. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 419 stored program component. The mail client may be a mail viewing application, such as Apple Mail, Microsoft Entourage, Microsoft Outlook, Mozilla Thunderbird, etc.

In some embodiments, computer system 401 may store user/application data 424, such as the data, variables, records, etc. (e.g., a data repository, node properties, mapped node properties, risk rating factors, input values, input points, etc.) as described in this disclosure. Computer system 401 may also store application data including a middleware migration system 420, comprising a migration configuration engine 421, a scan processor 422, and/or a migration engine 423. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Figure 5:
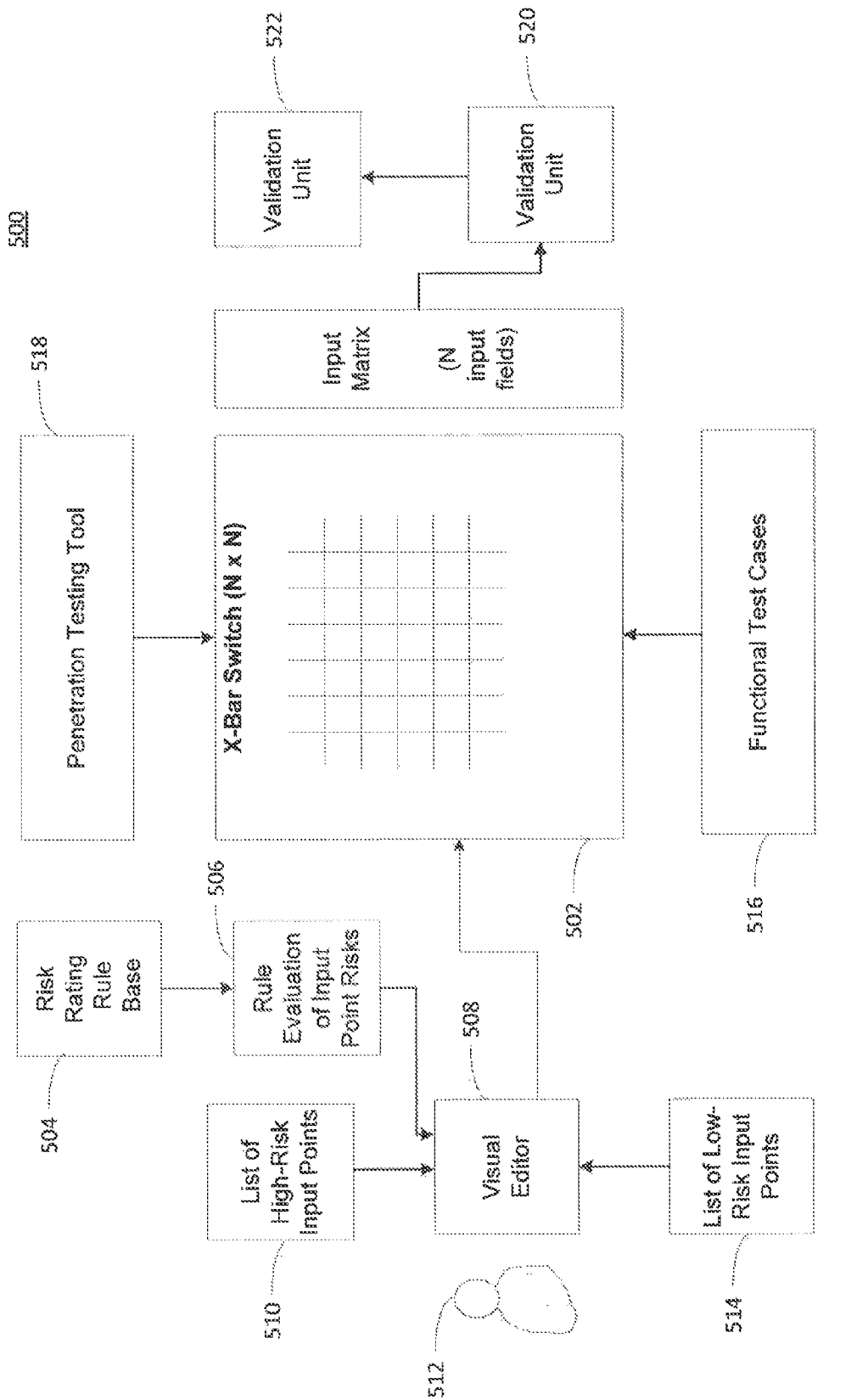
FIG. 5 is a functional block diagram illustrating another example hybrid testing system, according to some embodiments of the present disclosure.

FIG. 5 depicts a functional block diagram illustrating another exemplary hybrid testing system 500. It will be appreciated from this disclosure that the number and arrangement of these components is exemplary only and provided for purposes of illustration. Other arrangements and numbers of components may be utilized without departing from the teachings and embodiments of the present disclosure.

Software Cross-Bar Switch 502 may be a key element of hybrid testing system 500, with Penetration Testing tool 518 in one side, injecting traffic for all of the inputs of the Software Under Test (SUT) 520, while the Functional Test Cases 516 on the other side also injecting traffic for the same set of inputs. The overlap of the input values, one comprehensive set created by the Penetration Testing tool 518 and another comprehensive set created by the Functional Test cases 516, require to be resolved by the X-Bar Switch 502 at the center.

If SUT 520 has N inputs, then X-Bar Switch 502 may be an (N×N) matrix, with one column for each input and one row for each output. X-Bar Switch 502 may be a diagonal matrix, i.e., only the cells (I, I) are relevant, for $0<=I<=N-1$. In some embodiments, a cell at position (I, I) of X-Bar Switch 502 may have a value deciding whether the Penetration Testing Tool 518 generated value would win and be subjected to the I-th input of SUT 520, or whether the Functional Test Case 516 value would win and be subjected to the I-th input of the SUT 520. Each cell of X-Bar Switch 502 is essentially a selector, either facing up (bringing in the Penetration Test tool value) or facing down (bringing in the Functional Test case value). The values of X-Bar Switch 502 diagonal cells are either 1 or –1, indicating the above two choices. All other cells of X-Bar Switch 502 are valued 0, and are irrelevant.

Risk Rating Rule Base 504 may be a Rule Base (either in a spreadsheet, with Macros executed, or in a lightweight DB with SQL queries executed) that captures the risk of inputs using the following criteria: Source of the input (intranet, or extranet), Credibility of the response provider (employees, customers, strangers, . . . ), Positioning of the security first few lines of defense against attackers with respect to the Software Under Test run-time placement in the Production environment.

Rule Evaluation of Input Point Risks 506 may, for each input to SUT 520, evaluate the risk for the respective input, by executing Risk Rating Rule Base 504. An input may be either High Risk, which assigns it a Rating=1, or Low Risk, which assigns it a Rating=0.

Values to X-Bar Switch 502 are fed (initiated) by a Visual Editor 508, shown to its left. The initial values for X-Bar Switch 502 may be provided (pre-populated) by Risk Rating Rule Base 504, however, the Security Test Architect 512 operating Visual Editor 508 has value override ability. Security Test Architect 512 may be intimately familiar with the role of each one of the N input values to SUT 520. For example, if one input is a person's name, whereas another input is a person's Social Security Number, then the Security Test Architect must understand the legal and compliance implications of each type of data for the respective input. Security Test Architect 512 may be intimately familiar with the source of the input, as would be expected to be generated in the Prod environment of SUT 520. For example, if one input (the person's name) is generated from a user operating from intranet source only, then it would be marked lower in Risk rating, than another input (the person's Social Security Number) provided over the internet from a remote browser. Security Test Architect 512 may have a complete knowledge of the Prod deployment environment with respect to the SUT 520, and specifically must know the locations of the Firewall, the IDS/IPS and all potential (legitimate, and attacker) users of the said application. Security Test Architect 512 may be intimately familiar with the type and value sensitivity of the respective inputs. As an example, if one particular input field is a CHAR, then the effect of injecting nulls or special characters require to be provisioned. Whereas, if another particular input is a Numeric, then negative large values or Zero, or Positive exponential (out of range) values must be tested.

Based upon the application knowledge, and intimate awareness of the Prod execution environment of the application, Security Test Architect 512 may obtain input from List of High Risk Input Points 510 and List of Low-Risk Input Points 514. Both these lists may be pre-generated by an application domain specialist. However, Security Test Architect 512 must combine the two lists, and compare and determine which one wins for each one of the N input points.

The other components of hybrid testing system 500 include SUT 520, which operates upon receiving the N input values for the software, executes the application, and validates the output per business case logic. An important distinction required to be made re: output validation for business case logic (which is applicable only for functional test designated inputs), vis-à-vis validating the stability of SUT 520 (which is applicable for the security test designated inputs). As/when the security test succeeds, SUT 520 is expected to break, instead of providing predictable response, and Security Test Architect 512 is expected to be aware as how to differentiate between the two sets of such outcome.

Penetration Testing Tool 518 may be a commercial or freeware SIT-stage security vulnerability detection tool. It generates traffic, to inject SUT 520 with, for each input point for the SUT 520. Functional Test Cases 516 may be business use cases generated values for each input point of SUT 520.

Figure 6:
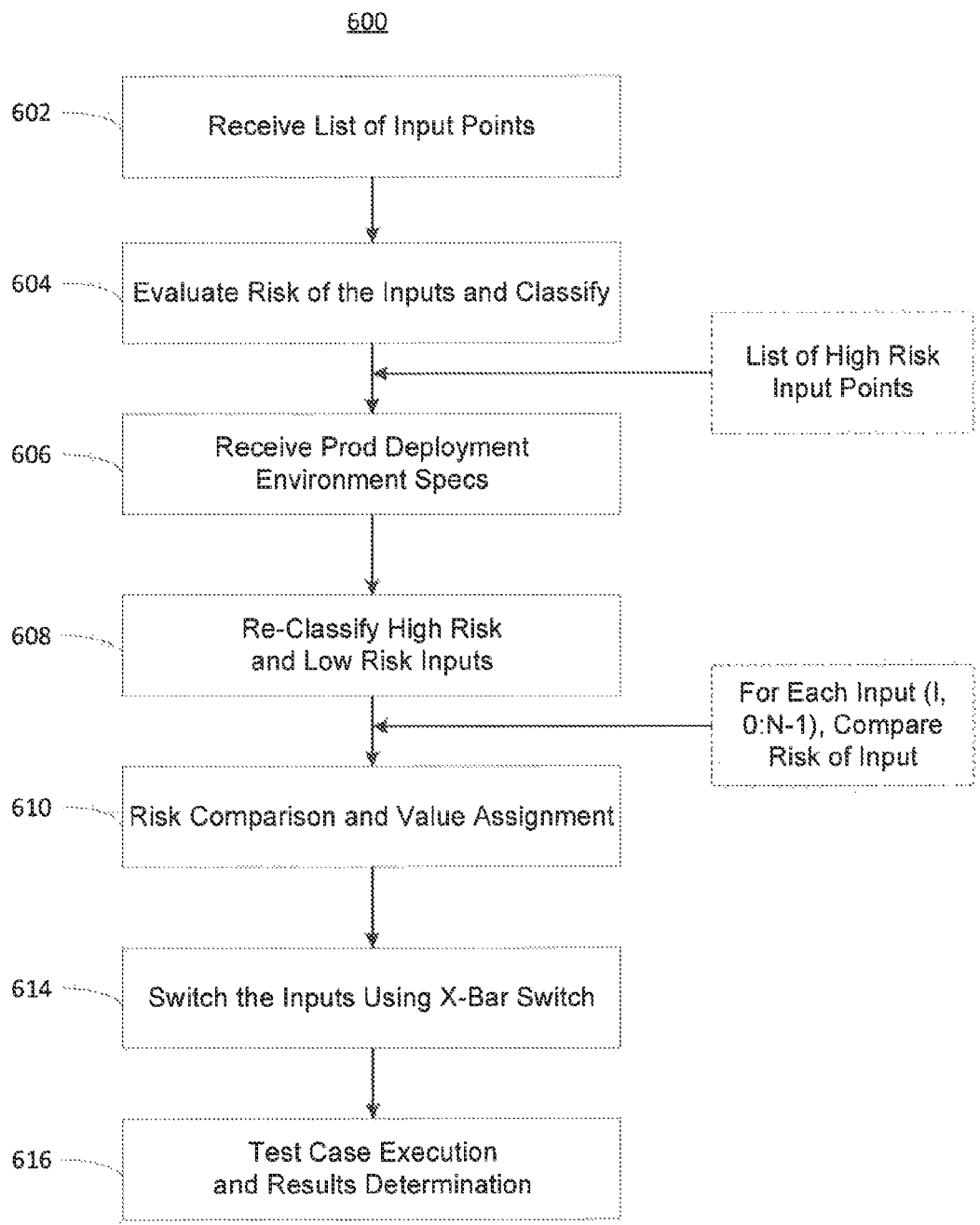
FIG. 6 is a flow diagram illustrating an example method for hybrid testing, in accordance with some embodiments of the present disclosure.

FIG. 6 depicts a flowchart of an example method 600, consistent with some embodiments and aspects of the present disclosure. Method 600 may be implemented, for example, for hybrid testing. In some embodiments, method 600 may be implemented as one or more computer programs executed by one or more processors. Moreover, in some embodiments, method 200 may be implemented by a hybrid test system (e.g., hybrid test system 100, hybrid tester 110, or hybrid test system 500 having one or more processors executing one or more computer programs stored on a non-transitory computer readable medium).

In some embodiments, example method 600 may include a test Architect receiving the list of N input points for the Software Under Test (SUT) at 602.

In some embodiments, example method 600 may include evaluating risk of the inputs and classify at 604. The N input points are each evaluated by the Risk Rating Rule Base to be categorized as either High Risk or Low Risk. This process of categorization produces two lists—one for High Risk Input Points, and the other for Low Risk Input Points.

In some embodiments, example method 600 may include receiving Prod Deployment Environment Specs at 606. Next, the Production deployment configuration diagram is received and assessed against these two lists—the High Risk and the Low Risk input points lists.

In some embodiments, example method 600 may include re-classifying High Risk and Low Risk Inputs at 608. Depending upon the Production environment certain input may require to be re-classified from one list to the other.

In some embodiments, example method 600 may include Risk Comparison and Value Assignment at 610. Post classification, the two lists are processed on a per Input basis to assign a value=1, if the particular Input is High Risk, and –1 if the particular Input is Low Risk. These (1, or –1) values are populated to the X-Bar Switch, for the N input values. The Visual Editor displays the pre-populated N input values to the Security Test Architect. The Security Test Architect does not need to manually generate these values, however, s/he may override certain values.

In some embodiments, example method 600 may include switching the inputs using X-bar switch at 614. For each input position, $0<=j<=N-1$, the X-Bar Switch copies the value of the j-th input from the Penetration Testing tool if the j-th element in the X-Bar Switch has a value=1. If the j-th element in the X-Bar switch has a value=–1, then instead of the Penetration Testing tool generated value, the value from the Functional Test cases are taken. Hence, the inputs values and populated and steered per X-Bar Switch.

In some embodiments, example method 600 may include Test Case Execution and Results Determination at 616. Finally, the test cases are executed, and results validation are done. Functional test cases are separated from security test case defects. For security defects, false positives are detected and eliminated.

Figure 7:
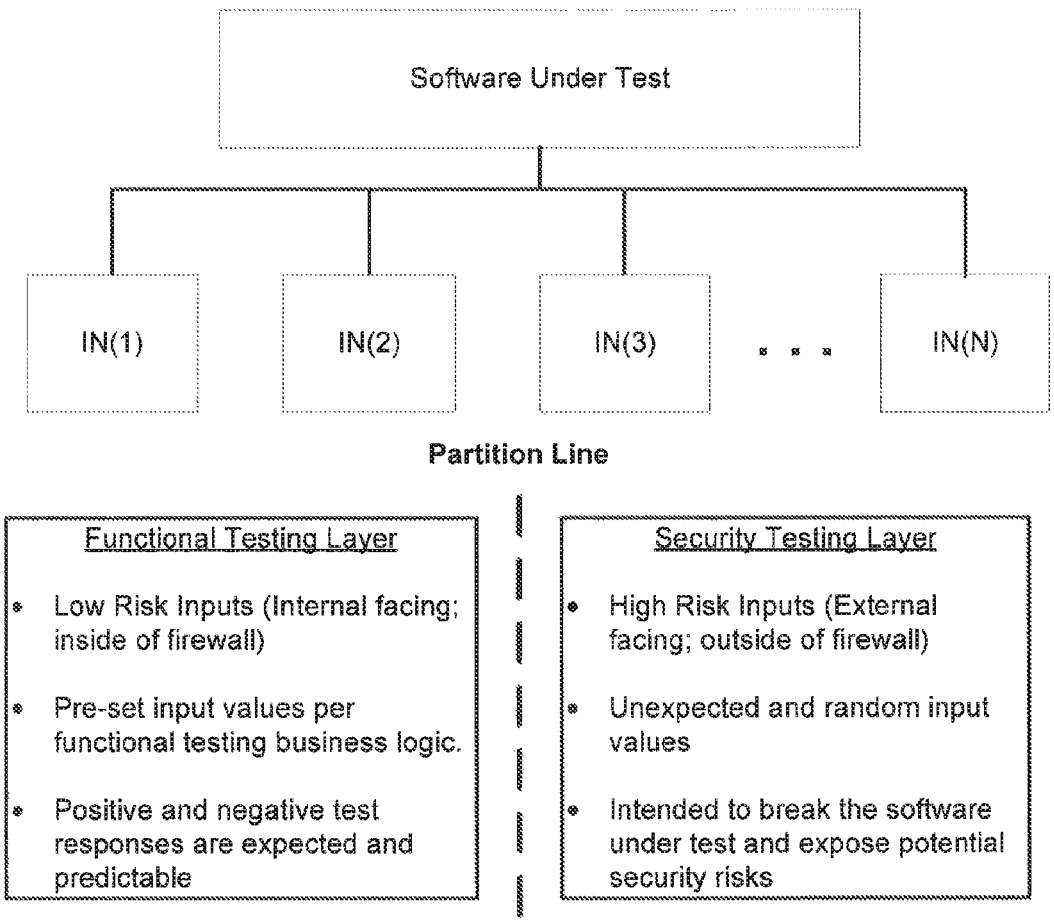
FIG. 7 illustrates and example hybrid test partition of input values to respective input points, according to some embodiments and aspects of the present disclosure.

FIG. 7 illustrates and example hybrid test partition of input values to respective input points, according to some embodiments and aspects of the present disclosure. The example hybrid test partition shows a full-fledged solution with the flexibility to assign specific risk ratings for each input, and then quarantine the inputs above a certain risk rating threshold to be subject to the penetration testing tool, and allocating the rest to the functional test specific values.

The underlying idea of the present subject matter, namely bringing the benefits of (input space optimized) functional testing to the (input space non-optimized) domain of security testing, falls under the broad topic of hybrid testing. It may be noted that the idea of combining benefits of functional testing and security testing can be extended to the various implementations without deviating from scope of the invention.

In one implementation, the Risk Values computed, both as the input risk factors, and the risk thresholds, may be dynamically obtained, either by (i) computation with one or more rules, or by (ii) user provision, or by (iii) table lookup. The benefits of a non-static, and user controlled Risk values will include the ability to adopt to changing environment requirements, e.g., a project that is operating in a high risk environment as opposed to another project in a lower risk environment. This ability is particularly applicable to software security in power grid, or software security in mission critical applications.

In another implementation, once a set of inputs are designated to be high risk, and thus qualifying to receiving its input values from security test module (aka. the penetration test module)—two or more sub-groups of Risk levels (all within the higher echelon of Risk) may be imposed within the security inputs. As an example, if the software under test has 20 inputs and 12 of them are identified to be high risk, thus the said 12 would require to be value populated by the penetration testing tool—the next proposed idea is to further partition this 12 inputs into perhaps two or three sub-groups, e.g., (Highest 4), (Next high 6) and (last High 2). The idea is to split the 12 inputs into multiple groups, e.g., 3 groups in this example. The goal underlying to this idea is further optimization. The very highest group clearly needs to be allocated all wild character and null values and control character as inputs. Suppose, a particular Input K (amongst this 12 input fields) could be populated to 400 distinct values, consisting of all possible wild characters, null, control characters and so on. Now, if input K is indeed in the very highest bracket of security risk, i.e., the (Highest 4) then input K should certainly be subject to all of the 500 distinct input values. But, suppose input K is high risk, but not the very highest group, instead the $2^{nd}$ highest group—i.e., the (Next high 6), then a potential optimization is perhaps not to populate all the 500 input values, but every $2^{nd}$ or every 3rd of the 500 input values. Likewise, if the input K belongs to the third highest risk group, i.e., the (last High 2)—then one may further optimize by taking every $5^{th}$ or every $10^{th}$ of the 500 input values. The idea is to progressively sparse out the input values that are populated. With a judicious usage of Modulus or Div function, one may reduce the large number of input values that security (penetration) test imposes. Overall, this idea falls within the scope of hybrid testing, where multi-ary Risk level is considered, extending from binary Risk level.

In one implementation, the current idea of optimizing a test that is inherently a security test, but by using values from functional test domain, can be reversed to propose a dual objective. In the dual objective, the test designer starts with a functional test, but adds hardening to the functional test by selectively identifying a few input points which become worthy of security hardening. The designated hardened inputs are assigned more values than the nominal functional testing calls for. This idea can be described as "bringing functional testing towards security testing. "whereas the main idea proposed in this invention would be dual—i.e., "bringing security testing towards functional testing".

In one implementation, within the lower Risk part, where input values are being assigned functional test values, a further optimization can be done by using orthogonal array concept, i.e., by pre-populating only selective pairs of inputs values as opposed to all possible combinations of input values.

The specification has described methods and systems for migrating an interface. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for hybrid testing, comprising:
receiving a list of input points associated with a software unit under test, wherein the list of input points correspond to one or more locations in the software unit under test that allow external sources to provide inputs for testing the software unit under test;
assigning, by a processor, risk values to the input points based on one or more risk rating factors, the risk values reflecting security risk associated with the input points, including:
serially comparing a value of each risk rating factor with respective threshold values; and
calculating, by the processor, a weighted vector sum value for each input point based on the one or more risk rating factors when no risk rating factor value exceeds a corresponding respective threshold value of the respective threshold values;
updating, by the processor, the risk values assigned to the input points to updated risk values based on a user input on determining that the risk values assigned to the input points are incorrect;
providing, to the software unit under test, input values indicative of a functional test for input points based on assigned updated risk values reflecting a low security risk; and
providing, to the software unit under test, input values indicative of a security test for input points based on assigned updated risk values reflecting a high security risk; and
executing a security test for the software unit under test based on the input values indicative of a functional test and the input values indicative of a security test.

2. The method of claim 1, wherein the security test comprises at least one of a penetration test and a source code security test.

3. The method of claim 1, wherein the one or more risk rating factors comprise at least one of a source of input associated with each input point, credibility of a provider of the input, transmission line security of the channel for inputs that are remotely provided, positioning of the input points relative to a firewall, or intrusion detection and intrusion prevention associated with the software unit under test.

4. The method of claim 1, wherein assigning risk values to the input points further comprises:
calculating, by the processor, a risk value for each input point when one of the risk rating factor values exceeds the corresponding respective threshold value; and
comparing the weighted vector sum value to a threshold risk value.

5. The method of claim 4, further comprising:
assigning, by the processor, a risk value reflecting a low security risk to input points having a weighted vector sum value less than the threshold risk value; and
assigning, by the processor, a risk value reflecting a high security risk to input points having a weighted vector sum value greater than the threshold risk value.

6. The method of claim 1, wherein assigning risk values to the input points further comprises:
splitting one or more input points, reflecting the high security risk, into a plurality of risk levels based on the risk values; and
providing, to the software unit under test, input values indicative of a security test for the one or more input points based on the plurality of risk levels.

7. A system for hybrid testing, comprising:
one or more hardware processors; and
one or more memory devices storing instructions executable by the one or more hardware processors for:
receiving a list of input points associated with a software unit under test, wherein the list of input points correspond to one or more locations in the software unit under test that allow external sources to provide inputs for testing the software unit under test;
assigning, by a processor, risk values to the input points based on one or more risk rating factors, the risk values reflecting security risk associated with the input points, including:
serially comparing a value of each risk rating factor with respective threshold values; and
calculating, by the processor, a weighted vector sum value for each received input point based on the one or more risk rating factors upon identifying that no risk rating factor value exceeds a corresponding respective threshold value of the respective threshold values;
updating the risk values assigned to the input points to updated risk values based on a user input on determining that the risk values assigned to the input points are incorrect;
providing, to the software unit under test, input values indicative of a functional test for input points based on assigned updated risk values reflecting a low security risk; and
providing, to the software unit under test, input values indicative of a security test for input points based on assigned updated risk values reflecting a high security risk; and
executing a security test for the software unit under test based on the input values indicative of a functional test and the input values indicative of a security test.

8. The system of claim 7, wherein the security test comprises at least one of a penetration test and a source code security test.

9. The system of claim 7, wherein the one or more risk rating factors comprise at least one of a source of input associated with each input point, credibility of a provider of the input, transmission line security of the channel for inputs that are remotely provided, positioning of the input points relative to a firewall, or intrusion detection and intrusion prevention associated with the software unit under test.

10. The system of claim 7, wherein the one or more memory devices store instructions executable by the one or more hardware processors for assigning risk values to the input points by:
calculating, by the processor, a risk value for each input point, the risk value being calculated when one of the risk rating factor values exceeds the corresponding respective threshold value; and
comparing the weighted vector sum value to a threshold risk value.

11. The system of claim 10, wherein the one or more memory devices store instructions executable by the one or more hardware processors for:
assigning, by the processor, a risk value reflecting a low security risk to input points having a weighted vector sum value less than the threshold risk value; and
assigning, by the processor, a risk value reflecting a high security risk to input points having a weighted vector sum value greater than the threshold risk value.

12. The system of claim 7, wherein the one or more memory devices store instructions executable by the one or more hardware processors for assigning risk values to the input points by:
- splitting one or more input points, reflecting the high security risk, into a plurality of risk levels based on the risk values; and
- providing, to the software unit under test, input values indicative of a security test for the one or more input points based on the plurality of risk levels.

13. A non-transitory computer-readable medium storing instructions for hybrid testing, the instructions comprising:
- receiving a list of input points associated with a software unit under test, wherein the list of input points correspond to one or more locations in the software unit under test that allow external sources to provide inputs for testing the software unit under test;
- assigning, by a processor, risk values to the input points based on one or more risk rating factors, the risk values reflecting security risk associated with the input points, including:
  - serially comparing a value of each risk rating factor with respective threshold values; and
  - calculating, by the processor, a weighted vector sum value for each received input point based on the one or more risk rating factors upon identifying that no risk rating factor value exceeds a corresponding respective threshold value of the respective threshold values;
- updating the risk values assigned to the input points to updated risk values based on a user input on determining that the risk values assigned to the input points are incorrect;
- providing, to the software unit under test, input values indicative of a functional test for input points based on assigned updated risk values reflecting a low security risk; and
- providing, to the software unit under test, input values indicative of a security test for input points based on assigned updated risk values reflecting a high security risk; and
- executing a security test for the software unit under test based on the input values indicative of a functional test and the input values indicative of a security test.

14. The medium of claim 13, wherein the security test comprises at least one of a penetration test and a source code security test.

15. The medium of claim 13, wherein the one or more risk rating factors comprise at least one of a source of input associated with each input point, credibility of a provider of the input, transmission line security of the channel for inputs that are remotely provided, positioning of the input points relative to a firewall, or intrusion detection and intrusion prevention associated with the software unit under test.

16. The medium of claim 13, wherein assigning risk values to the input points comprises:
- calculating, by the processor, a risk value for each input point, the risk value being calculated when one of the risk rating factor values exceeds the corresponding respective threshold value; and
- comparing the weighted vector sum value to a threshold risk value.

17. The medium of claim 16, the instructions further comprising:
- assigning, by the processor, a risk value reflecting a low security risk to input points having a weighted vector sum value less than the threshold risk value; and
- assigning, by the processor, a risk value reflecting a high security risk to input points having a weighted vector sum value greater than the threshold risk value.

18. The medium of claim 13, wherein assigning risk values to the input points further comprises:
- splitting one or more input points, reflecting the high security risk, into a plurality of risk levels based on the risk values; and
- providing, to the software unit under test, input values indicative of a security test for the one or more input points based on the plurality of risk levels.

* * * * *